United States Patent
Byrne et al.

(10) Patent No.: US 6,347,312 B1
(45) Date of Patent: Feb. 12, 2002

(54) LIGHTWEIGHT DIRECTORY ACCESS PROTOCOL (LDAP) DIRECTORY SERVER CACHE MECHANISM AND METHOD

(75) Inventors: Debora Jean Byrne, Austin, TX (US); Chetan Ram Murthy, New York, NY (US); Shaw-Ben Shi; Chin-Long Shu, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/187,071

(22) Filed: Nov. 5, 1998

(51) Int. Cl.$^7$ ............................................. G06F 17/30
(52) U.S. Cl. .................. 707/3; 707/10; 709/218
(58) Field of Search ...................... 707/1, 5, 10, 3; 709/217–218

(56) References Cited

U.S. PATENT DOCUMENTS

| | | | |
|---|---|---|---|
| 4,920,478 A | | 4/1990 | Furuya et al. ............... 364/200 |
| 5,715,443 A | | 2/1998 | Yanagihara et al. ......... 395/603 |
| 5,752,264 A | | 5/1998 | Blake et al. ................. 711/144 |
| 5,758,146 A | | 5/1998 | Schiefer et al. ................ 707/2 |
| 5,822,749 A | * | 10/1998 | Agarwal ......................... 707/2 |
| 6,014,667 A | * | 1/2000 | Jenkins et al. ................ 707/10 |
| 6,016,499 A | * | 1/2000 | Ferguson .................... 707/104 |
| 6,052,681 A | * | 4/2000 | Harvey .......................... 707/3 |
| 6,073,129 A | * | 6/2000 | Levine et al. .................. 707/4 |
| 6,085,188 A | * | 7/2000 | Bachmann et al. ............ 707/3 |
| 6,101,541 A | * | 8/2000 | Ellesson et al. ............ 709/225 |

OTHER PUBLICATIONS

Reference Guide for Image Search & Retrieval(IS&R) Computer–Based Training(CBT), for U.S. PTO, Jul. 11, 1997, sections: 3.4.3.4.1,3.7,3.12 p.38.*

* cited by examiner

*Primary Examiner*—John Breene
*Assistant Examiner*—Susan Rayyan
(74) *Attorney, Agent, or Firm*—Winstead Sechrest & Minick P.C.; Jeffrey S. LaBaw (57) ABSTRACT

A method of hierarchical LDAP searching in an LDAP directory service having a relational database management system (DBMS) as a backing store. The method begins in response to a search query to the relational database. Search results retrieved in response to the search query are cached, preferably in a pair of caches in the directory service. The first cache receives a set of identifiers indexed by a filter key of the search query. The search results, namely entries corresponding to the set of identifiers, are then stored in the second cache. In response to subsequent issuance of the search query, the cached search results are then used in lieu of accessing the relational database to increase search efficiency. To maintain the integrity of the cached information, routines are provided to invalidate the caches during given directory service operations.

26 Claims, 5 Drawing Sheets

LIGHTWEIGHT DIRECTORY ACCESS PROTOCOL (LDAP) DIRECTORY SERVER CACHE MECHANISM AND METHOD

BACKGROUND OF THE INVENTION

1. Technical Field

This invention relates generally to providing directory services in a distributed computing environment.

2. Description of the Related Art

A directory service is the central point where network services, security services and applications can form a integrated distributed computing environment. The current use of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information of all users in a system composed of a number of interconnected machine. The central repository of user information enables a system administrator to administer the distributed system as a single system image. Still another directory service is a "yellow pages" lookup provided by some e-mail clients e.g., Netscape Communicator, Lotus Notes, Endora and the like.

With more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of attribute name, attribute value and Boolean operations like AND, OR and NOT. Users can use the filter to perform complex search operations. The filter syntax is defined in RFC 1960.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

One of main goals for implementing an LDAP directory service with an relational database backing store (e.g., DB/2) is to provide a design and implementation such that all LDAP search queries can be executed efficiently. In the case of repetitive searches involving the same search query, however, it is not cost-effective to return to the backing store repetitively due to the nature of the database management system. In particular, it is very time consuming and expensive to go through the DBMS layers necessary to access entries inside the database for every entry required to be returned.

One approach to solving this problem is to use the backing store's cache. While this approach has been implemented and has proved somewhat useful, it still requires repetitive access to the backing store from the directory service. Moreover, use of the relational database backing store does not provide significant enough performance enhancements to justify the more complex caching mechanism required.

There remains a need to address the problem of efficient handling of repetitive searches issued from a hierarchical directory service to a relational database backing store.

BRIEF SUMMARY OF THE INVENTION

It is a primary object of this invention to obviate repetitive inquiries into a relational database backing store used by a hierarchical-based directory service.

It is another primary object to search a relational database using hierarchical, filter-based queries, such as LDAP, and efficiently caching search results to increase search efficiency for repetitive queries.

Another primary object of this invention is to cache search results in a more efficient manner in a directory service having a relational database backing store.

Still another important object of this invention is to provide a mechanism for populating a local storage area associated with an LDAP directory service with directory search results retrieved from a relational database (e.g., DE/2) backing store.

Yet another important object of this invention is to enhance the efficiency of a directory service using a caching mechanism.

A more general object of this invention is to provide more efficient, less expensive hierarchical LDAP searches using relational tables in an LDAP directory service having a relational database management system (DBMS) as a backing store.

A still more general object of this invention is to provide a reliable and scaleable enterprise directory solution, wherein a preferred implementation is LDAP using a DB/2 backing store.

These and other objects are provided in a method for searching a relational database using hierarchical, filter-based search queries. The method begins in response to a search query to the relational database. Search results retrieved in response to the search query are cached, preferably in a local storage area of the directory service. In response to subsequent issuance of the search query, the cached search results are then used preferentially in lieu of re-accessing the relational database to increase search efficiency.

According to a feature of the present invention, the search results are cached in a unique manner to facilitate use of these results for subsequent, repetitive queries. Preferably, first and second caches are established in the local storage area. The first cache is sometimes referred to herein as a Type I cache, and the second cache is sometimes referred herein as a Type II cache. The first cache receives a set of identifiers indexed by a filter key of the search query. The search results, namely entries corresponding to the set of identifiers, are then stored in the second cache. The present invention thus provides a mechanism for populating the Type I and Type II caches. In addition, the mechanism modifies information in the caches during (or as a result of) given directory service operations (e.g., modify, modify rdn, delete and add) that would otherwise invalidate the cached information. Thus, whenever a repetitive search query is generated within the directory service, search results are selectively fetched from the caches instead of being retrieved from the relational database. Cached information remains current at all times using the invalidation routines. This operation significantly reduces the cost of processing the repetitive search query.

Preferably, the filter-based query is a Lightweight Directory Access Protocol (LDAP) directory service query and the relational database is DB/2 or some other convenient backing store. As noted above, preferably the local storage area is associated with the directory service for enhanced query response. The Type I and Type II caches are preferably dedicated portions of the directory service local storage area.

In accordance with a more specific aspect of the invention, a method for searching a relational database (e.g., DB/2) from a Lightweight Directory Access Protocol (LDAP) directory service utilizes first and second caches associated with the directory service to obviate use of the backing store when receiving repetitive search queries. Preferably, a given unit of the first cache is a set of identifiers that qualified for the LDAP search of a particular filter key. Each given unit of the second cache is an entry qualified for the search and is indexed by its identifier.

The present invention also describes a computer program product in a computer readable media that implements an algorithm for populating the Type I and Type II caches, and that implements an algorithm for invalidating the caches during given directory service operations. A directory service implementing this inventive mechanism is also described.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
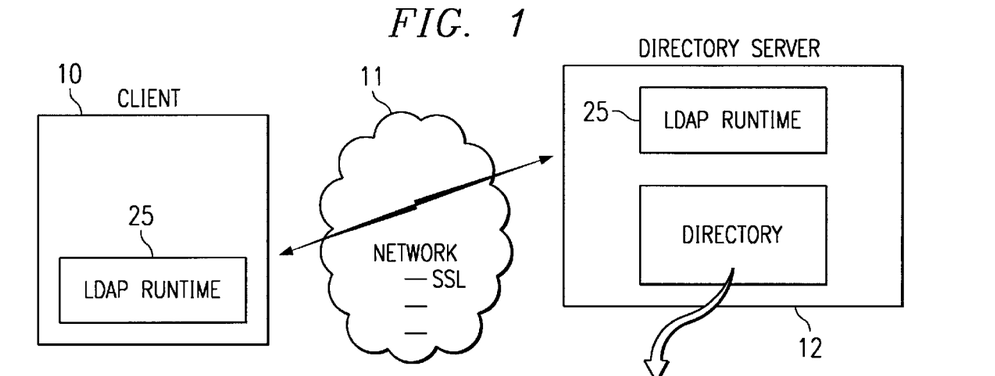
FIG. 1 is a representative LDAP directory service implementation.
Figure 2:
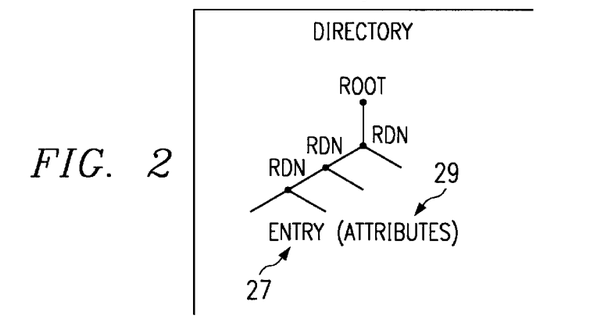
FIG. 2 is a simplified LDAP directory.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection over network II to an LDAP server 12, sends requests and receives responses. LDAP server 12 supports a directory 21 as illustrated in a simplified form in FIG. 2. Each of the client and server machines further include a directory "runtime" component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the "scope" supported by LDAP search are: base, one level and subtree. LDAP does not support search for arbitrary tree levels and path enumeration.

Figure 3:
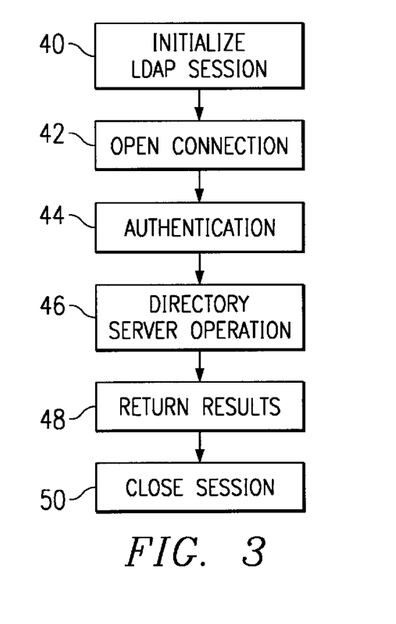
FIG. 3 is a flowchart of an LDAP directory session.

LDAP includes an application programming interface (API), as described in "The C LDAP Application Program Interface", IETF Task Force Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init() returns a handle to the client, and this handle allows multiple connections to be open at one time. At step 44, the client authenticates to the LDAP server using, for example, an API ldap_bind() function. At step 46, one or more LDAP operations are performed. For example, the API function ldap_search() may be used to perform a given directory search. At step 48, the LDAP server returns the results. The session is then closed at step 50 with the API ldap_unbind() function then being used to close the connection.

Figure 4A:
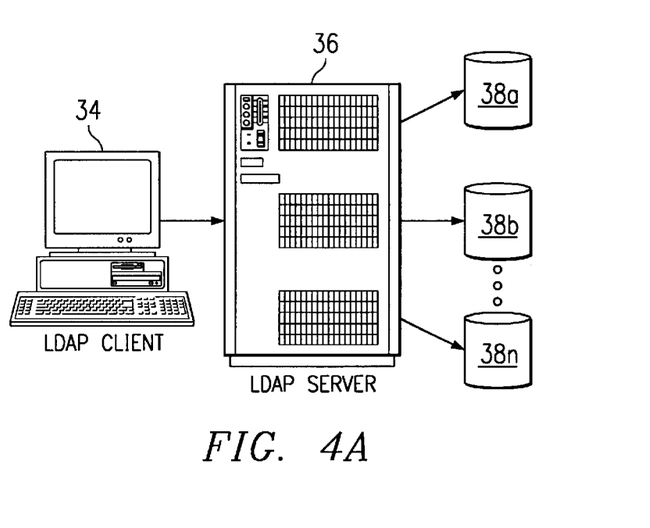
FIGS. 4A–4C show representative LDAP directory service implementations having relational database backing store.
Figure 4B:
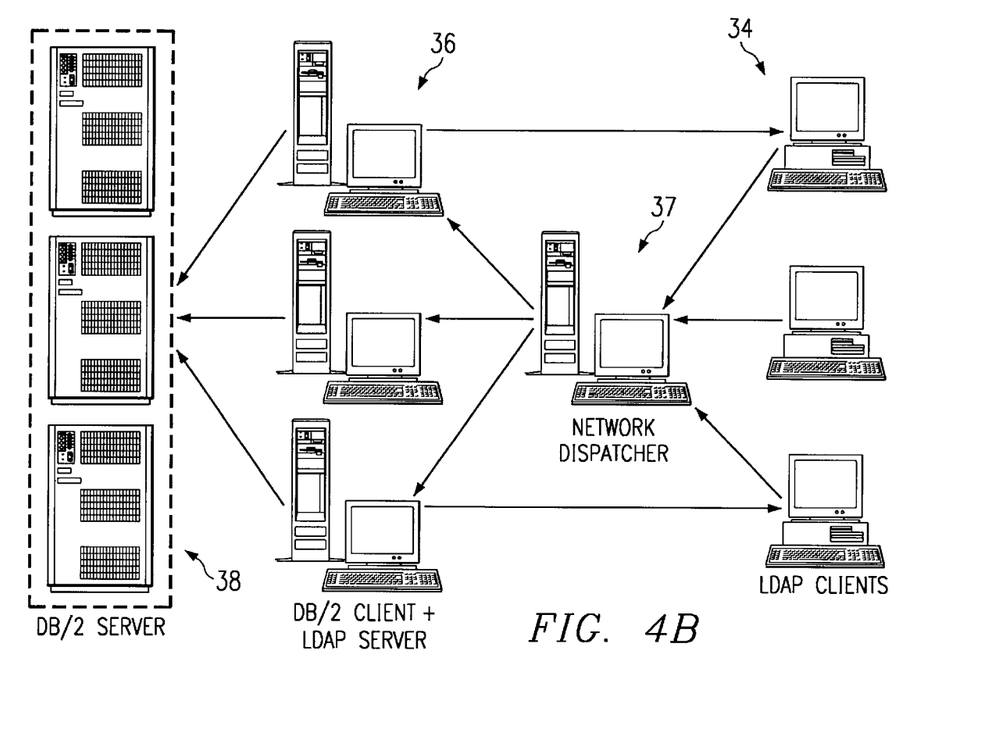
Figure 4C:
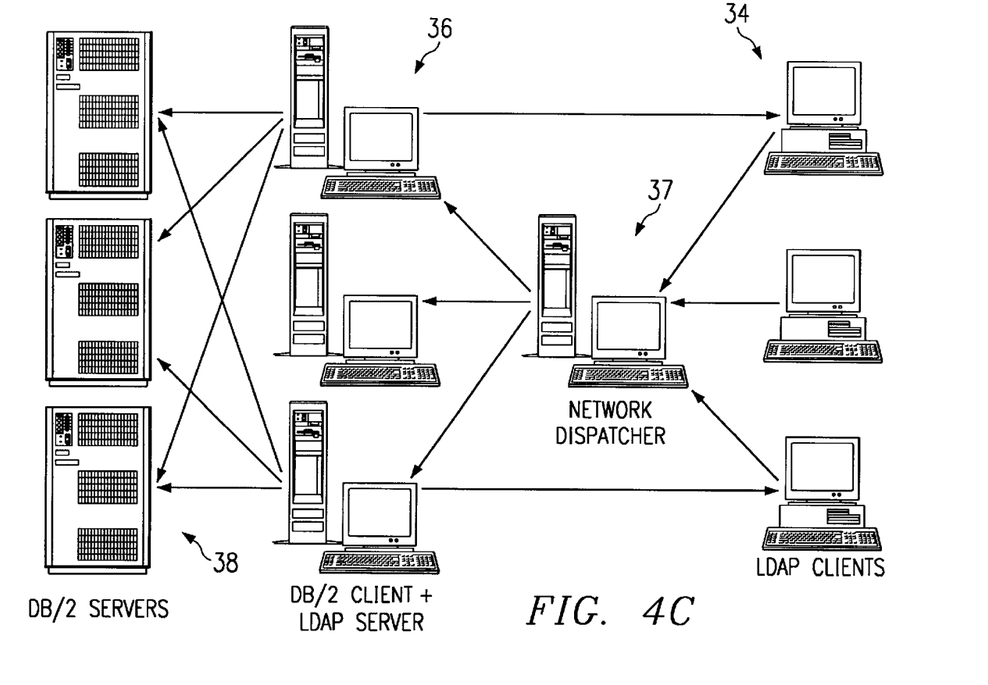

It may be desirable to store LDAP directory data in a backing store. FIGS. 4A–4C illustrates several representative LDAP directory service implementations that use a relational database management system (RDBMS) for this purpose. These systems merely illustrate possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4A, an LDAP client 34 can connect to a number of networked databases 38a–58n through an LDAP server 36. The databases 38a–38n contain the directory information. However, from the user's perspective, the LDAP server 36 actually stores all the information without knowing the database 38 in which the data is actually located. With this configuration, the LDAP server 36 is freed from managing the physical data storage and is able to retrieve information from multiple database servers 38 which work together to form a huge data storage.

FIG. 4B illustrates a multiple client/multiple server LDAP/DB2 enterprise solution. In this environment, a DB/2 client preferably runs on each LDAP server 36. Each such DB/2 client can connect to any database server 38 containing directory information. The collection of database servers 38a–38n form a single directory system image, and one or more of the LDAP servers 36 can access such information. Because all the LDAP servers 36 see the same directory image, a network dispatcher 37 may be deployed to route requests among the LDAP servers 36.

FIG. 4C illustrates a multiple client/parallel super server configuration. In certain environment where users need to store large amount of information into the directory, this configuration automatically partitions the database into different machines 38. In addition, database queries are divided into smaller, independent tasks that can execute concurrently, which increases end user query response time. This configuration enables users to store up to terabytes of data into the database.

One of ordinary skill should appreciate that the system architectures illustrated in FIGS. 4A–4C are not to be taken as limiting the present invention.

Figure 5:
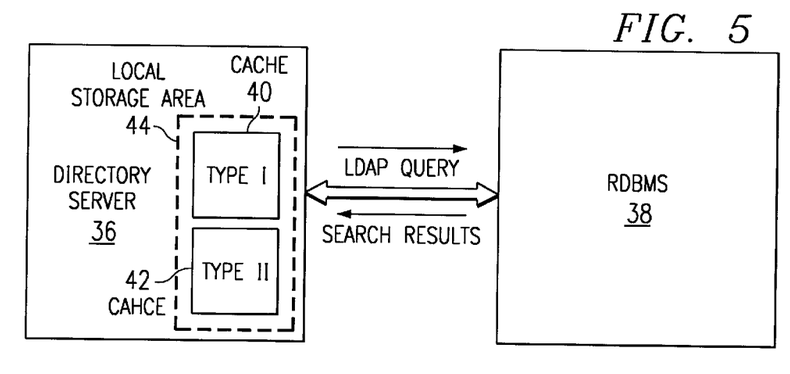
FIG. 5 is a simplified block diagram of the directory service caching mechanism of the present invention.

With the above as background, FIG. 5 illustrates a block diagram of an inventive caching mechanism that is preferably implemented at or in association with the LDAP directory service. The directory service includes an LDAP server 36 and a relational database backing store 38 as previously described. LDAP server 36 is typically a computer having suitable memory partitioned into a first cache 40 and a second cache 42. The first cache 40 is sometimes referred to herein as a Type I cache, and the second cache 42 is sometimes referred to herein as a Type II cache. First and second caches 40 and 42 may comprise part of the same local storage area 44, or each cache may be associated with its own local storage area. As used herein, the designations "first" and "second" thus may not designate different physical structures. In a preferred embodiment, the Type I and Type II caches are merely separate memory locations of the same random access memory (RAM) of the LDAP server, although any suitable storage area(s) may be used for this purpose.

By implementing the Type I and Type II caches in the directory service local storage area, repetitive search queries are handled without resort to the relational database 38. This caching mechanism provides significant performance improvements given that conventional LDAP directory servers are search-oriented and have many repetitive searches. According to the invention, a unit of the Type I cache is a set of identifiers (Ids) which qualify for a given LDAP search query of a particular filter key. The unit is indexed by that filter key. A unit of Type II cache is an entry qualified for the search and is indexed by its identifier.

Figure 6:
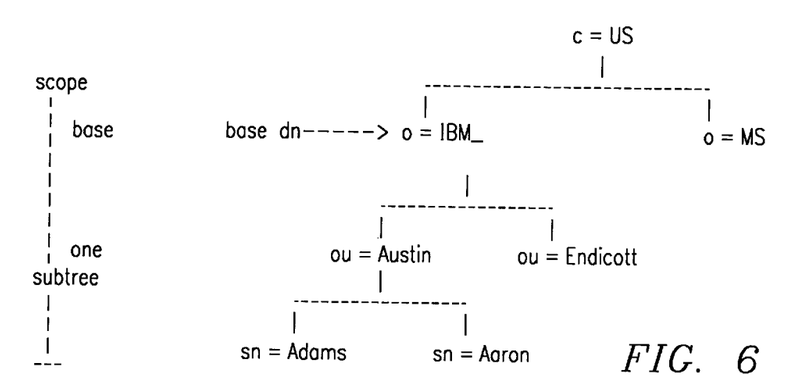
FIG. 6 is a representative LDAP directory tree.

By way of example, and with reference to the representative directory tree in FIG. 6, a typical LDAP search may be as follows:

ldapsearch –b "c=IBM_US, c=US" –s sub (sn=smith);
where: "–b" is the base distinguished name (dn) from which the search is initiated, "–s" is the scope of the search (either base, one or subtree), and "sn=smith" is the filter string that specifies the condition the search needs to find matches in the directory. The three elements above form a unique combination of criteria for a given LDAP search query. As is well known, a filter key is a combination of filter string+scope+base dn, and each filter key is thus unique for an LDAP search. In the above example, the filter key is:

"(sn=smith)2o=IBM_US, c=US", where 2 is a numeric representation of the scope subtree level (with base level being 0 and one level being 1).

Figure 7:
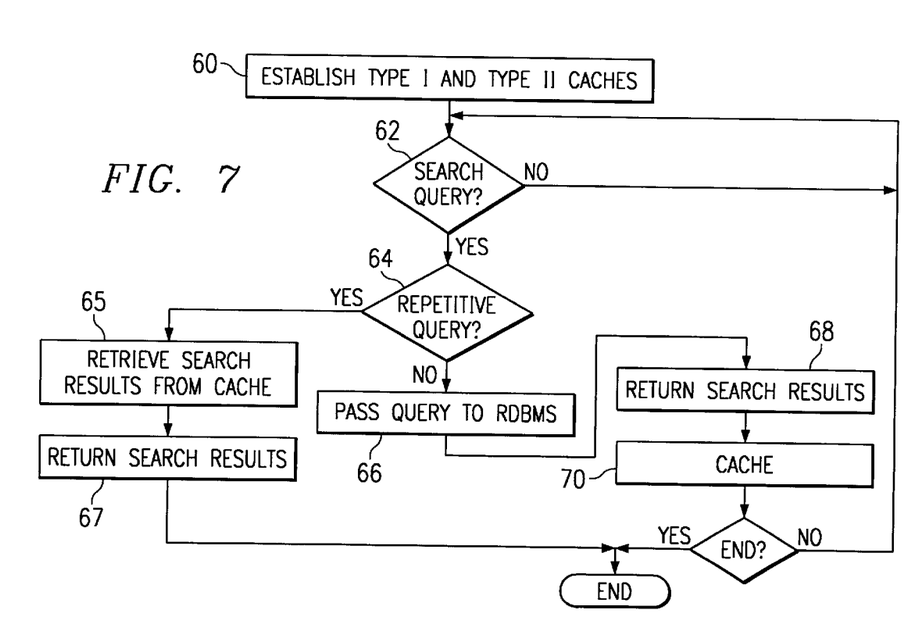
FIG. 7 is a simplified flowchart of the inventive method for hierarchical LDAP searching in an LDAP directory service having a relational database management system as a backing store wherein search results are selectively cached in the directory service caching mechanism of FIG. 5.

FIG. 7 is a representative flowchart of the inventive caching method. As described above, the method is preferably implemented in an LDAP directory service having a DB/2 relational database backing store, although one of ordinary skill will appreciate that the inventive technique may be used to search any relational database using hierarchical, filter-based database queries. The method begins at step 60 by establishing the Type I and Type II caches, preferably in a directory server. At step 62, a test is run to determine whether an LDAP search query has been issued. If not, the routine cycles. If, however, the outcome of the test at step 62 indicates that a search query has been issued, the routine continues at step 64 to determine whether the search query has been previously serviced. If the outcome of the test at step 64 is negative, the search query is processed by communicating the query to the relational database at step 66 and then returning the search results at step 68. In this processing path, the search results are cached at step 70 and the routine then returns to step 62 or terminates. If, however, the outcome of the test at step 64 is positive, which indicates that the query is a repetitive one, the routine branches to step 65 to retrieve the search results from the cache in lieu of going back to the relational database. These results are then returned to the inquiring client or process at step 67. This completes the processing.

As will be seen, the inventive caching scheme preferably takes advantage of several LDAP table structures that are now described below. Further details about these structures are provided in U.S. Ser. No. 09/050,503, titled "A Fast And Efficient Method To Support Hierarchical LDAP Searches With Relational Tables", assigned to the assignee of this application, and incorporated herein by reference.

Entry Table:

This table holds the information about a LDAP entry. This table is used for obtaining the EID of the entry and supporting LDAP_SCOPE_ONELEVEL and LDAP_SCOPE_BASE search scope.

EID. The unique identifier of the LDAP entry. This field is indexed.

PEID. The unique identifier of a parent LDAP entry in the naming hierarchy.

EntryData. Entries are stored using a simple text format of the form "attribute: value". Non-ASCII values or values that are too long to fit on a reasonable sized line are represented using a base 64 encoding. Giving an ID, the corresponding entry can be returned with a single SELECT statement.

Descendant Table:

The purpose of this table is to support the subtree search feature of LDAP. For each LDAP entry with, a unique ID (AEID), this table contains the descendant entries unique identifiers (DEID). The columns in this table are:

AEID. The unique identifier of the ancestor LDAP entry. This entry is indexed.

DEID. The unique identifier of the descend LDAP entry. This entry is indexed.

Attribute Table:

One table per searchable attribute. Each LDAP entry is assigned an unique identifier (EID) by the backing store. The columns for this table are:

EID

Attribute value

Thus, in the parent table, the EID field is the unique identifier of an entry in the LDAP naming hierarchy. The PEID field is the unique identifier of the parent entry in the naming hierarchy. In the descendant table, the AEID field is the unique identifier of a ancestor LDAP entry in the LDAP naming hierarchy. The DEID field is the unique identifier of the descend LDAP entry.

In addition to the table structures described above, the following SQL SELECT statements are used by LDAP/DB2 search routines:

Base Level Search:
SELECT entry.EntryData,
  from ldap_entry as entry
  where entry.EID in (
    select distinct ldap_entry.EID
    from <table list>
    where (ldap_entry.EID=<root dn id>)
      <sql where expressions>)

One Level Search:
SELECT entry.EntryData,
  from ldap_entry as entry
  where distinct ldap_entry.EID
  from ldap_entry, <table list>
    ldap_entry as pchild, <list of tables>
    where ldap_entry.EID=pchild.EID
    AND pchild.PIED=<root dn id>
      <sql where expressions>)

Subtree Search
SELECT entry. EntryData,
  from ldap_entry as entry
  where entry.EID in (
    select distinct ldap_dentry.EID
    from ldap_entry, ldap_desc, <table list>
    where
      (LDAP_ENTRY.EID=ldap_desc.DEID AND
        ldap_desc.AEID=<root dn id>)
    ldap_entry as pchild. <table list>
    where ldap_entry.EID=ldap_desc.EID
    AND ldap_desc.AEID=%d <where expressions>).

In the above representation, <table list> and <where expression> are the two null terminated strings returned by the SQL generator. The <root dn id> is the unique identifier of the root dn. The where clause should only be generated if <where expression> is not the empty string and no errors where detected in the parsing the LDAP filter.

As is well-known, LDAP search queries comprise six basic filters with the format <attribute> <operator> <value>. Complex search filters are generated by combining basic filters with Boolean operators AND (&), OR (|) and NOT (!). For each LDAP filter element or sub-expression, there is a set of entries (EIDS) that will satisfy the element. Thus, each element generally maps to a set of EIDs.

Figure 8:
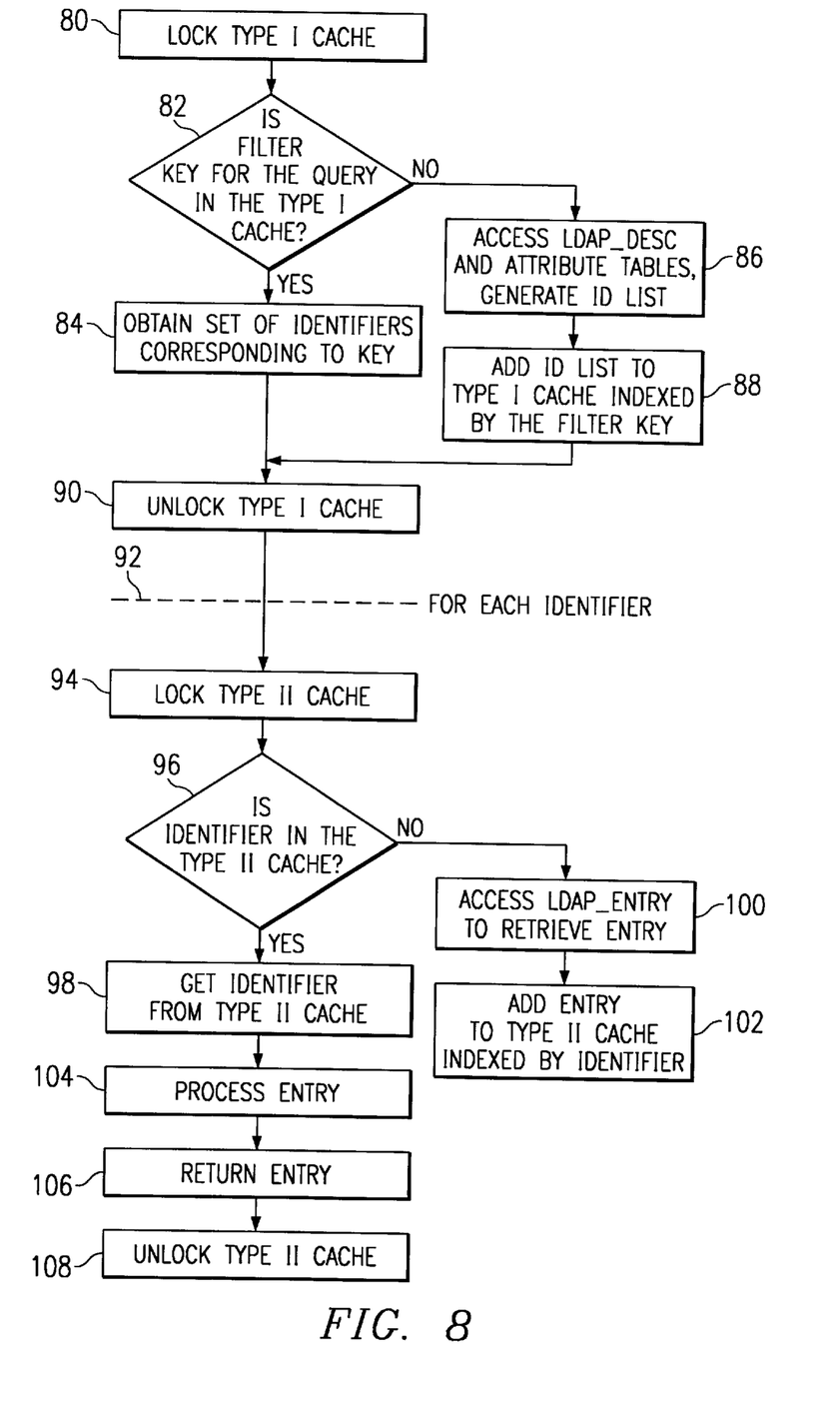
FIG. 8 is a detailed flowchart of a preferred routine for populating the Type I and Type II caches of the present invention.

FIG. 8 is a flowchart illustrating the preferred routine of the present invention for populating the cache. The routine begins at step 80 by locking the Type I cache. At step 82, a test is performed to determine whether the filter key for a given LDAP search query can be found in the Type I cache. If the outcome of the test at step 82 is positive, the routine continues at step 84 to obtain a set of identifiers corresponding to that filter key from the cache. If the outcome of the test at step 82 is negative, the routine accesses LDAP_DESC and the attribute tables (in the relational database) at step 86 to obtain candidate identifiers and generate an identifier list (namely, the set of identifiers). At step 88, the identifier list is added to the Type I cache indexed by the filter key. The cache is then unlocked at step 90. At this point of the operation, an identifier list has been formed which is either retrieved from the Type I cache or retrieved from the tables in the relational database. The routine then continues at step 92.

In particular, for each identifier in the identifier list, the routine continues at step 94 by locking the Type II cache. A test is then performed at step 96 to determine if the identifier can be found in the Type II cache. If the outcome of the test at step 96 is positive, the routine continues at step 98 to get the entry corresponding to that identifier from the Type II cache. If the outcome of the test at step 96 is negative, the routine accesses the LDAP_ENTRY table (in the relational database) at step 100 to retrieve the entry given the identifier. At step 102, the entry is added to the Type II cache indexed by the identifier. At this point in the process flow, an entry is formed which is either retrieved from the Type II cache or retrieved from the LDAP_ENTRY table.

The routine then continues at step 104 to process the entry with ACL information. At step 106, the entry is sent back to the client or other process initiated the search query. At step 108, the Type II cache is unlocked.

The following is a representative picture of the Type I and II caches following such an operation: Example:

Type I cache:

| filter key | ids |
|---|---|
| (|(sn = smith) (ou = Austin)) | → (2,765,2001) |
| (cn = John) | → (23,56) |
| (jobresponsibility = programmer) | → (1,17) |

Type II cache:

| id | | entry (abbreviation) |
|---|---|---|
| 1 | → | rjla |
| 2 | → | xxx |
| 17 | → | dskjf |
| 23 | → | yyyy |
| 56 | → | kklf |
| 765 | → | ppdf |
| 2001 | → | sdfffv |

The following is a detailed listing of a preferred code implementation of the above-described algorithm of FIG. 8:

```
mutex_lock (lock_cache_I)
if the filter key can be found in the type I cache
```

```
            get the id list (a set of ids) corresponding to that filter
                key from type I cache
        else
            access LDAP_DESC and attributes tables to get can-
                didate ids and put them in an id list (a set of ids).
            add the id list to the type I cache indexed by the filter
                key
        endif
    mutex_unlock (lock_cache_I)
    /* so far an id list is formed which is either retrieved from
        type I cache or retrieved from the tables of the database
        */
    for each id in that id list
        mutex_lock (lock_cache_II)
        if id can be found in the type II cache
            get the entry corresponding to that id from type II
                cache.
        else
            access LDAP_ENTRY table to retrieve the entry
                given the id
            add the entry to type II cache indexed by the id
        endif
        /*so far an entry is formed which is either retrieved from
            type II cache or from LDAP_ENTRY table */
        process entry with ACL info
        send entry back to client
        mutex_unlock (lock_cache_II)
    endfor
```

Figure 9:
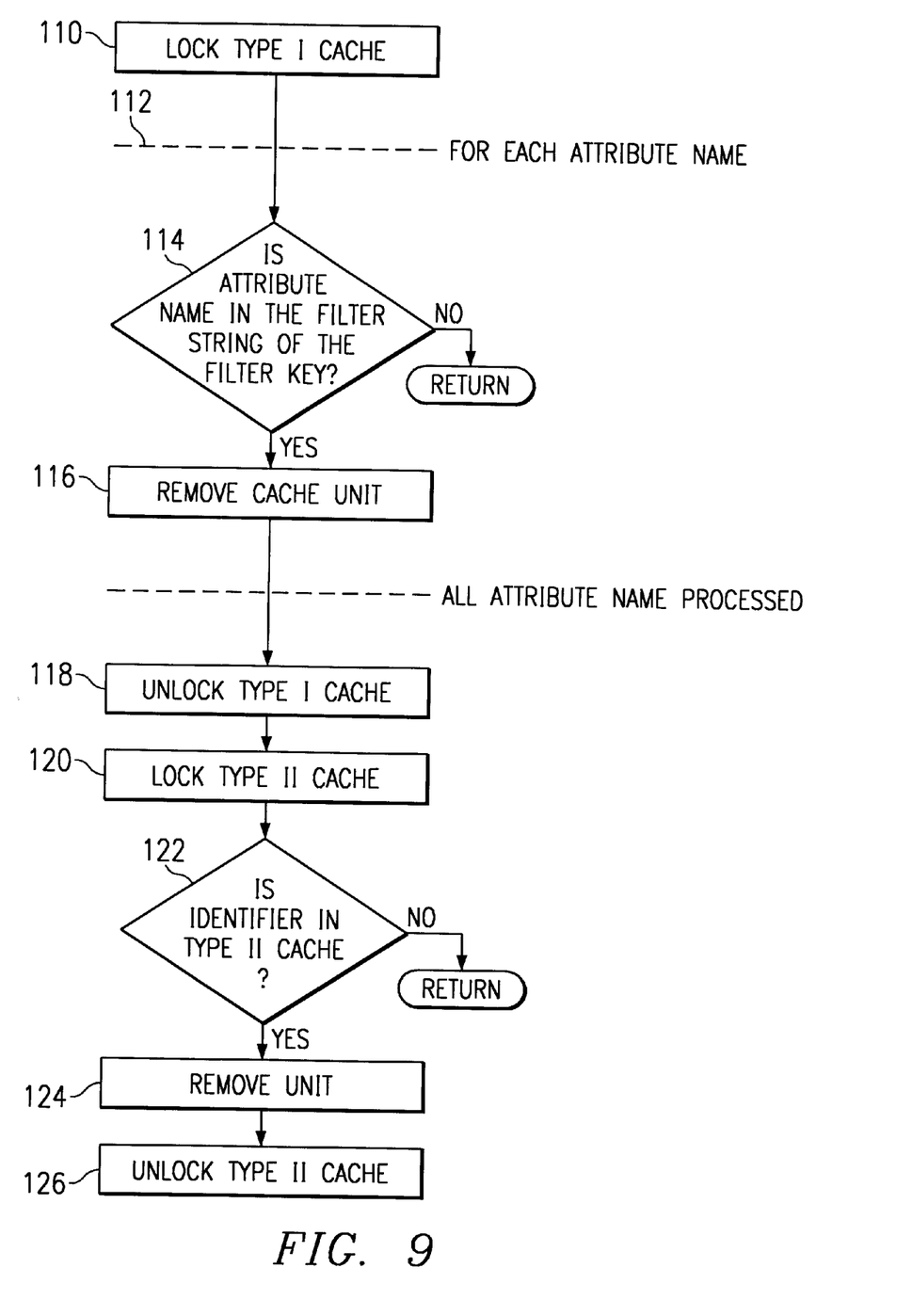
FIG. 9 is a flowchart of a preferred routine for invalidating the cache during an LDAP modify operation.

According to the present invention, it is necessary to "invalidate" the cache during particular directory service operations (e.g., modify, modify rdn, delete and add operations) which would otherwise impact cached information. Inadvertently the cache according to the invention refers to a set of processes for maintaining the integrity of the cached data during RDBMS operations that would otherwise alter the contents of the backing store which formed the original search results for the query. FIG. 9 illustrates a flowchart of a preferred routine for invalidating the cache during a representative operation, the LDAP modify operation.

The routine assumes that particular search results have been stored in the cache in response to a search query and that the RDBMS contents are being modified prior to a repetitive query. The routine begins at step 110 by locking the Type I cache. Step 112 is then repeated for each attribute name that is modified in the relational database. In particular, a test is performed at step 114 to determine if the attribute name is in the filter string of the filter key for the search query. If the outcome of the test at step 114 is positive, the routine continues at step 116 by removing the cache unit (namely, the identifier list and the filter key). After all attribute names have been processed in this manner, the routine unlocks the Type I cache at step 118. The routine then continues at step 120 to lock the Type II cache. A test is then performed at step 122 to determine if the identifier of the modified entry is in the Type II cache. If the outcome of the test at step 122 is positive, the routine continues at step 124 to remove the unit (namely, the entry and its identifier). The Type II cache is then unlocked at step 126 to end the processing.

Using the above example, assume an entry with id 234 and cn and sn of the entry are modified. The caches then look as follows:

| Type I cache: | | |
|---|---|---|
| The units of | | |
| (&(sn = smith) (ou = Austin)) | → | (2,765, 2001) |
| (cn = Jonn) | → | (23,56) |
| will be removed | | |

Type II cache:
Nothing is removed.
    The caches will become:

| Type I cache: | | |
|---|---|---|
| filter key | | ids |
| (jobresposibility = programmer) | → | (1,17) |

| Type II cache: | | |
|---|---|---|
| id | | entry (abbreviation) |
| 1 | → | rjla |
| 2 | → | xxx |
| 17 | → | dskjf |
| 23 | → | yyyy |
| 56 | → | kklf |
| 765 | → | ppdf |
| 2001 | → | sdfffv |

The code of the LDAP modify operation described in FIG. 9 is set forth below:

```
    mutex_lock (lock_cache_I)
    for each attribute name that is modified
        if attribute name is in the filter string of the filter key,
            remove the unit (id list+filter key)
        endif
    endfor
    mutex_unlock (lock_cache_I)
    mutex_lock (lock_cache_II)
        if id of the modified entry is in the type II cache remove
            the unit (entry+id)
        endif
    mutex_lock (lock_cache_II)
```

The following are representative code listings for the other referenced LDAP operations that are processed to invalidate the cache information.

LDAP Modify Rdn Operation

```
    mutex_lock(lock_cache_I)
        if attribute name of the modified rdn is in the filter
            string of the filter key, remove the unit (id list+filter
            key)
        endif
    mutex_unlock(lock_cache_I)
    mutex_lock (lock_cache_II)
        if id of the modified entry is in the type II cache remove
            the unit (entry+id)
        endif
    mutex_unlock(lock_cache_II)
```

Example:
    An entry with id 23 and rdn cn is modified.
    Using the caches above in the i):
    Type I cache:

Nothing is removed.

| Type II cache | | |
|---|---|---|
| The unit 23 | → | yyyy will be removed. |

The caches will become

| Type I cache: | | |
|---|---|---|
| filter key | | ids |
| (jobresposibility = programmer) | → | 1,17 |
| Type II cache: | | |
| id | | entry (abbreviation) |
| 1 | → | rjla |
| 2 | → | xxx |
| 17 | → | dskjf |
| 56 | → | kklf |
| 765 | → | ppdf |
| 2001 | → | sdfffv |

LDAP delete operation
    mutex_lock (lock_cache_I)
    for each attribute name in the deleted entry
    if attribute name is in the filter string of the filter key
      remove the unit(id list+filter key)
    endif
    endfor
    mutex_unlock(lock_cache_I)
    mutex_lock (lock_cache_II)
    if id of the modified entry is in the type II cache remove the unit (entry+id)
    endif
    mutex_lock (lock_cache_II)
Example:
    An entry with id 4009 and attributes dn, ou, c, objectclass. Using the example above in ii):
    Type I cache:
      Nothing is removed
    Type II cache:
      Nothing is removed
LDAP add operation
    mutex_lock (lock_cache_I)
    for each attribute name in the added entry
    if attribute name is in the filter string of the filter key
      remove the unit (id list+filter key)
    endif
    endfor
    mutex_unlock (lock_cache_I)
    Type II cache is not affected at all.
Example:
    An entry with id 3515 and attributes dn, ou, c, objectclass and jobresponsibility.
    Using the example above in iii):

| The unit of | | |
|---|---|---|
| (jobresponsibility = program) will be removed | → | (1,17) |
| Type I cache: | | |

| filter key | ids |
|---|---|
| NULL | NULL |

According to another desirable feature of the invention, a double linked list preferably is used to keep track of the least recently used (LRU) unit in each cache. When the cache is full, the least recently used unit preferably will be flushed out.

As noted above, the invention may be implemented in any hierarchical directory service in which a relational database management system (RDBMS) is used to provide a backing store function. Typically, an SQL query is generated and used to access the relational database, and results are then returned in response to this query. Search results are cached preferably in a pair of caches associated with or implemented in the directory server. Preferably, each unit of Type I cache is a set of identifiers that qualify for the LDAP search of a particular filter key, and the unit is indexed by that filter key. A unit of Type II cache is an entry qualified for the search and is indexed by its identifiers. Routines are provided to populate the caches and, where necessary (e.g., when information in the relational database changes) to invalidate given information therein. The resulting cache mechanism is robust and ensures that repetitive search queries are managed through the cache as opposed to through repeated, yet unnecessary search queries from the directory service to the relational database.

One of ordinary skill will appreciate that the invention can be applied to any relational database management system (RDBMS). In addition, the EID sets approach can also be applied to b-tree based LDAP server implementation. The inventive algorithm may be applied to any LDAP server implementation, including Netscape Directory Server.

The present invention thus implements an LDAP server cache that provides significant advantages. Foremost, the inventive caching mechanism obviates the need to go back repetitively into the backing store on subsequent searches when information in the directory service is otherwise current. The technique also ensures that the caches are updated or modified as needed when LDAP operations are carried out. In a preferred embodiment, each of the caches are implemented in a suitable storage area, such as a random access memory of a computer. Compared with using a backing store cache, the present invention achieves significant performance improvement.

One of the preferred embodiments of the routines of this invention is as a set of instructions (computer program code) in a code module resident in or downloadable to the random access memory of a computer.

Having thus described our invention, what we claim as new and desire to secure by letters patent is set forth in the following claims.

What is claimed is:

1. A method for searching a relational database using hierarchical, filter-based search queries, comprising the steps of:

in response to a search query to the relational database, caching search results in a local storage area; and     in response to a subsequent issuance of the search query, using the cached search results in lieu of accessing the relational database.

2. The method as described in claim 1 wherein the filter-based query is a Lightweight Directory Access Protocol (LDAP) directory service query.

3. The method as described in claim 2 wherein the relational database is DB/2.

4. The method as described in claim 1 wherein the search results are cached according to a set of identifiers.

5. The method as described in claim 4 wherein the set of identifiers are cached in a first cache and indexed by a key and the search results are cached in a second cache.

6. The method as described in claim 5 wherein the search results include entries corresponding to the set of identifiers.

7. The method as described in claim 1 wherein the local storage area is associated with a directory service that generates the hierarchical, filter-based search queries.

8. The method as described in claim 7 further including the step of invalidating the cached search results during a given directory service operation.

9. The method as described in claim 8 wherein the given directory service operation is selected from the group of directory service operations consisting essentially of modify, delete and add operations.

10. A method for searching a relational database from a Lightweight Directory Access Protocol (LDAP) directory service generating filter-based queries, comprising the steps of:
in response to a search query to the relational database:
storing in a first cache a set of identifiers indexed by a filter key;
storing in a second cache directory entries corresponding to the set of identifiers; and
in response to subsequent issuance of the search query, using the identifiers and the directory entries in lieu of accessing the relational database.

11. The method as described in claim 10 wherein the first and second caches are associated with the LDAP directory service.

12. The method as described in claim 10 further including the step of selectively modifying information in the first and second caches as a result of an LDAP directory service operation prior to the new search query.

13. The method as described in claim 12 wherein the LDAP directory service operation is selected from the group of directory service operations consisting essentially of modify, delete and add operations.

14. A method for caching search results retrieved from a relational database in response to a Lightweight Directory Access Protocol (LDAP) directory service generating filter-based queries, comprising the steps of:
in response to an LDAP search query to the relational database:
storing in a first cache a set of identifiers indexed by a filter key; and
storing in a second cache directory entries corresponding to the set of identifiers.

15. The method as described in claim 14 wherein the first and second caches are associated with the LDAP directory service.

16. A computer program product in computer-readable media for searching a relational database using hierarchical, filter-based queries, comprising:

means responsive to a search query to the relational database for caching search results in a local storage area; and
means responsive to a subsequent issuance of the search query for using the cached search results in lieu of accessing the relational database.

17. The computer program product as described in claim 16 wherein the filter-based query is a Lightweight Directory Access Protocol (LDAP) directory service query.

18. The computer program product as described in claim 16 wherein the relational database is DB/2.

19. The computer program product as described in claim 16 further including means for invalidating the cached search results during a given directory service operation prior to the new search query.

20. The computer program product as described in claim 17 wherein the given directory service operation is selected from the group of directory service operations consisting essentially of modify, delete and add operations.

21. A directory service, comprising:
a directory organized as a naming hierarchy having a plurality of entries each represented by a unique identifier;
a relational database management system having a backing store for storing directory data;
means for searching the directory, comprising:
a first cache;
a second cache;
means for storing in the first cache a set of identifiers indexed by a filter key; and
means for storing in the second cache directory entries corresponding to the set of identifiers.

22. The directory service as described in claim 21 wherein the directory is compliant with the Lightweight Directory Access Protocol (LDAP).

23. The directory service as described in claim 22 wherein the relational database management system is DB/2.

24. In a directory service having a directory organized as a naming hierarchy, the hierarchy including a plurality of entries each represented by a unique identifier, the improvement comprising:
a relational database management system having a backing store for storing directory data;
means for searching the directory, comprising:
a first cache;
a second cache;
means for storing in the first cache a set of identifiers indexed by a filter key; and
means for storing in the second cache directory entries corresponding to the set of identifiers.

25. In the directory service as described in claim 24 wherein the directory is compliant with the Lightweight Directory Access Protocol (LDAP).

26. In the directory service as described in claim 25 wherein the relational database management system is DB/2.

* * * * *

UNITED STATES PATENT AND TRADEMARK OFFICE
CERTIFICATE OF CORRECTION

PATENT NO.      : 6,347,312 B1
DATED           : February 12, 2002
INVENTOR(S)     : Debora Jean Byrne, Chetan Ram Murthy, Shaw-Ben Shi and Chin-Long Shu It is certified that error appears in the above-identified patent and that said Letters Patent is hereby corrected as shown below:

Column 2,
Line 39, please replace "DE/2" with -- DB/2 --.

Column 8,
Line 8, please replace "(EIDS)" with -- (EIDs) --.

Signed and Sealed this

Sixteenth Day of July, 2002

Attest:

Attesting Officer

JAMES E. ROGAN
Director of the United States Patent and Trademark Office